United States Patent [19]

Haugen

[11] Patent Number: 4,546,445

[45] Date of Patent: Oct. 8, 1985

[54] SYSTOLIC COMPUTATIONAL ARRAY

[75] Inventor: Paul R. Haugen, Bloomington, Minn.

[73] Assignee: Honeywell Inc., Minneapolis, Minn.

[21] Appl. No.: 430,173

[22] Filed: Sep. 30, 1982

[51] Int. Cl.⁴ ............................................. G06F 15/34
[52] U.S. Cl. .................................................. 364/728
[58] Field of Search ................. 364/728, 824; 382/42; 324/77 H; 343/378

[56] References Cited

U.S. PATENT DOCUMENTS

| | | | |
|---|---|---|---|
| 3,878,381 | 4/1975 | Broder et al. | 364/728 |
| 3,961,171 | 6/1976 | Freeman | 364/728 |
| 4,080,660 | 3/1978 | Constant | 364/728 |
| 4,347,580 | 8/1982 | Bond | 364/824 |
| 4,392,232 | 7/1983 | Andren et al. | 364/728 |
| 4,398,274 | 8/1983 | Chotiros | 364/728 |

OTHER PUBLICATIONS

"A CCD Analog and Digital Correlator", Lagnado et al., *The International Conference on Charge Couple Devices*, Conference Three, 9/76, pp. 238-258.

*Primary Examiner*—James D. Thomas
*Assistant Examiner*—Dale M. Shaw
*Attorney, Agent, or Firm*—Stephen W. Buckingham

[57] ABSTRACT

The present invention provides a systolic computational array including two shift registers. Selected ones of the shift register stages are adapted to provide the values contained therein to two multiply-accumulate devices.

4 Claims, 4 Drawing Figures

SYSTOLIC COMPUTATIONAL ARRAY

The present invention relates to the high speed digital calculation of correlations.

BACKGROUND OF THE INVENTION

Many problems, particularly those in the area of signal processing, require the calculation of the correlation of two functions. Given two functions, X and Y, the correlation may be approximated through digital processes. In order to do this the functions must be sequentially sampled to produce the series $(x_1, x_2, x_3, ..., x_S)$ and $(y_1, y_2, y_3, ..., y_t)$. Using these series the correlation may be approximated as a series of summations of products of the elements of the X and Y series. Such a series of summations can be represented as $$\left( \sum_j x_j y_{j-N+1}, \sum_j x_j y_{j-N+2}, \sum_j x_{j-1} y_{j-N+2}, \sum_j x_{j-1} y_{j-N+3}, \ldots, \sum_j x_{j-N+2} y_j, \sum_j x_{j-N+1} y_j \right)$$

where the range of values of j over which the summation is performed is representative of the time period over which the correlation is to be calculated and the value of N is a measure of the bandwidth desired for the particular calculation.

The correlation series described above may be produced in various manners. On a general purpose computer each summation may be calculated from the values of the X and Y series. If the time-bandwidth product is large, or if a large number of x and y values are to be used, however, the time required to perform these calculations could be so large that real time processing of rapidly accumulating data is precluded. Such is often the case in the area of signal processing.

Parallel processing schemes provide methods of calculating a correlation series such as that shown above more rapidly. One such approach of the prior art is the use of a systolic array such as the one shown in prior art FIG. 1. The systolic array of FIG. 1 has a plurality of multiply-accumulate devices, 10, 11, 12, 13, and 14. A multiply-accumulate device typically has two data inputs. The device is adapted to accept pairs of numbers as input data, one member of each pair at each of the inputs, and to provide as output the sums of the products of consecutive pairs of numbers used.

In FIG. 1 five multiply-accumulate devices are shown. Typically more than this would be provided. In order to provide the most efficient processing 2N-1 multiply-accumulate devices are required, where N is the same as N in the example of the correlation series shown above. Additionally FIG. 1 shows two shift registers, each having 2N-1 stages.

In operation the values $x_j$ are inserted into shift register 15 and advanced through registers 16, 17, 18, and 19 while the values of $y_j$ are inserted into shift register 20 and advanced through registers 21, 22, 23, and 24. During a cycle of the apparatus each multiply-accumulate device which is in use during that cycle receives an x value at one input and a y value at the other input. For example, when shift register 10 is in use it receives an x value from shift register stage 15 at input 25 and a y value from shift register stage 24 at input 26.

One of the disadvantages of the prior art is that not all multiply-accumulate devices are used during any one cycle. The reason for this may be more clearly seen by reference to FIGS. 2A and 2B. Those figures show systolic arrays of the prior art where N is equal to 3, i.e. five stage shift registers are used.

FIG. 2A shows the state of such a system during a first clock cycle. Shift register stages 15, 17, and 19 contain the values $x_j$, $x_{j-1}$, and $x_{j-2}$ respectively. Likewise shift register stages 20, 22, and 24 contain the values $y_j$, $y_{j-1}$, and $y_{j-2}$. Each stage of a shift register transmits the value which it contains to the multiply-accumulate device input associated therewith. As illustrated, multiply-accumulate device 10 calculates $$\sum_j x_j y_{j-2}$$

over the course of the processing, while multiply-accumulate device 12 calculates $$\sum_j x_{j-1} y_{j-1}$$

and multiply-accumulate device 14 calculates $$\sum_j x_{j-2} y_j.$$

FIG. 2B illustrates the state of the system during the clock cycle following that of FIG. 2B. The values in the shift registers have advanced so that stages 16 and 18 now contain the values $x_j$ and $x_{j-1}$ respectively while stages 21 and 23 contain the values $y_j$ and $y_{j-1}$. As shown multiply-accumulate device 11 calculates $$\sum_j x_j y_{j-1}$$

and multiply-accumulate device 13 calculates $$\sum_j x_{j-1} y_j.$$

As shown in FIGS. 2A and 2B only a portion of the stages of the shift registers contain x or y values during any given clock cycle and only those multiply-accumulate devices associated with stages containing values are operative. If x and y values were to be loaded into the shift registers during every time period, so that all stages contained an x or y value at all times, every other x and y value would shift past one another and half of the desired summations would not be calculated.

SUMMARY OF THE INVENTION

The present invention provides a systolic computational array including two shift registers. Some, but not all, of the stages of each shift register are adapted to provide the value contained therein to two multiply-accumulate devices. In this manner 2N-1 summations may be performed using two N stage shift registers. Thus fewer shift register stages are required, leading to a proportionate space saving. Additionally the system of the present invention requires less time to calculate a correlation because values may be loaded into consecutive shift register stages and all multiply-accumulate devices operate during every cycle.

DETAILED DESCRIPTION OF A PREFERRED EMBODIMENT

Figure 1:
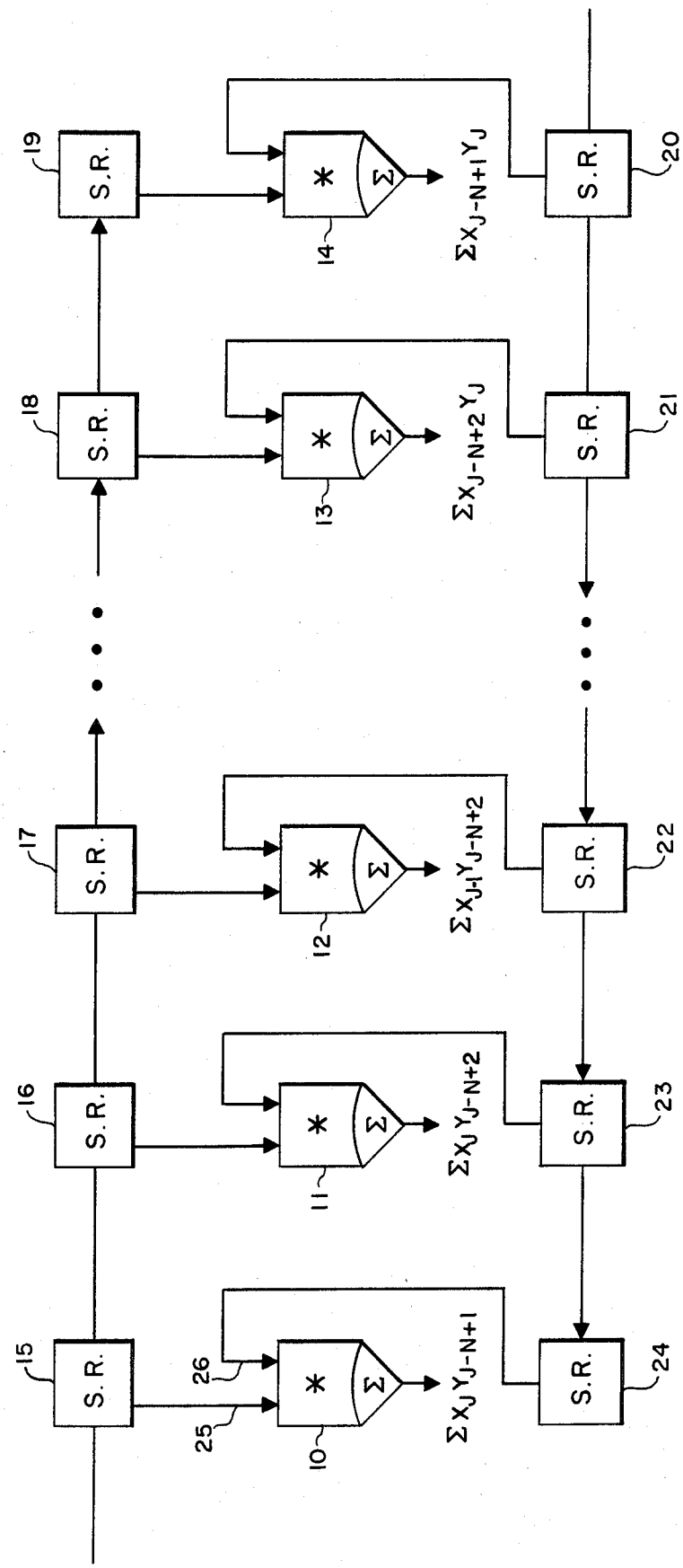
FIG. 1 is a block diagram of a prior art systolic array for the calculation of correlations.
Figure 2A:
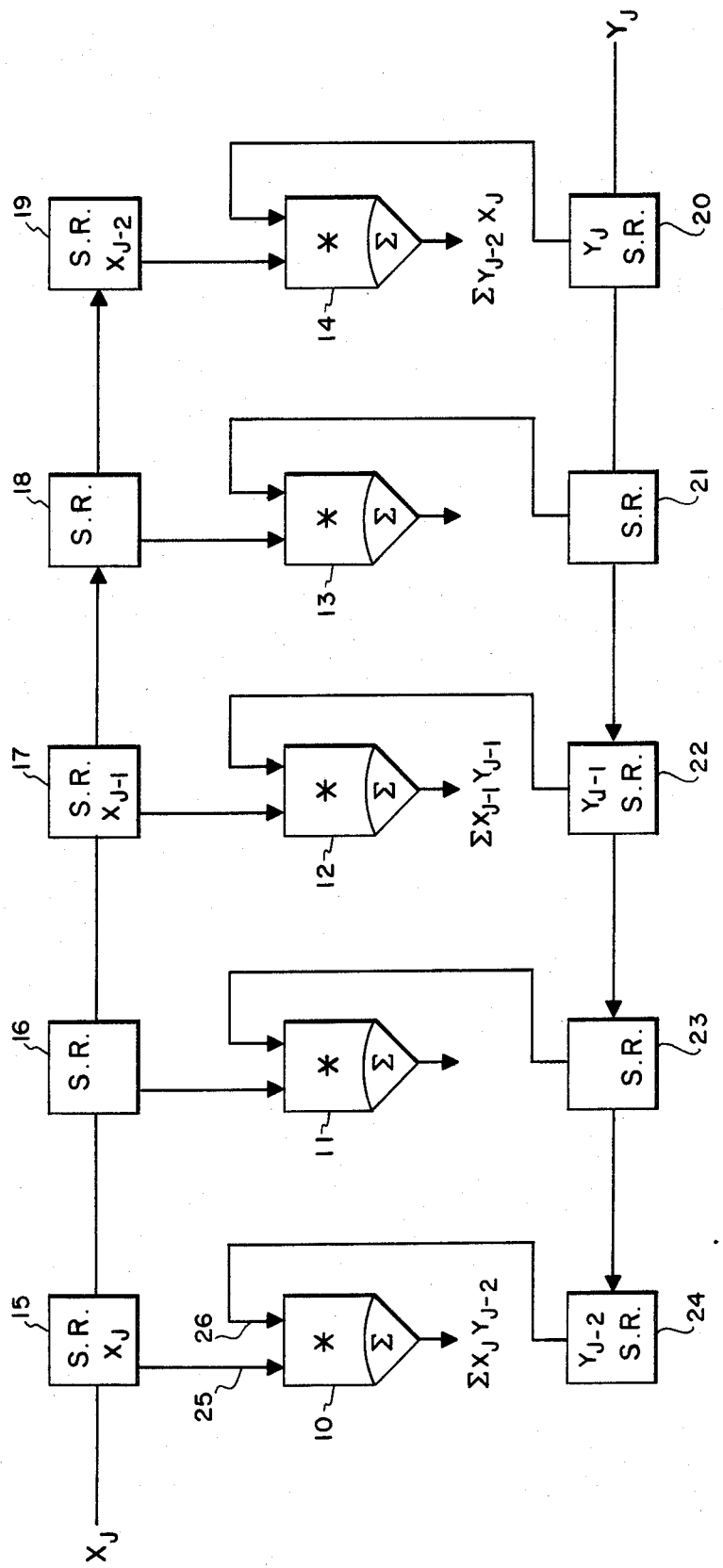
FIG. 2A is a block diagram of a prior art systolic array for the calculation of correlations showing its state during a first clock cycle.
Figure 2B:
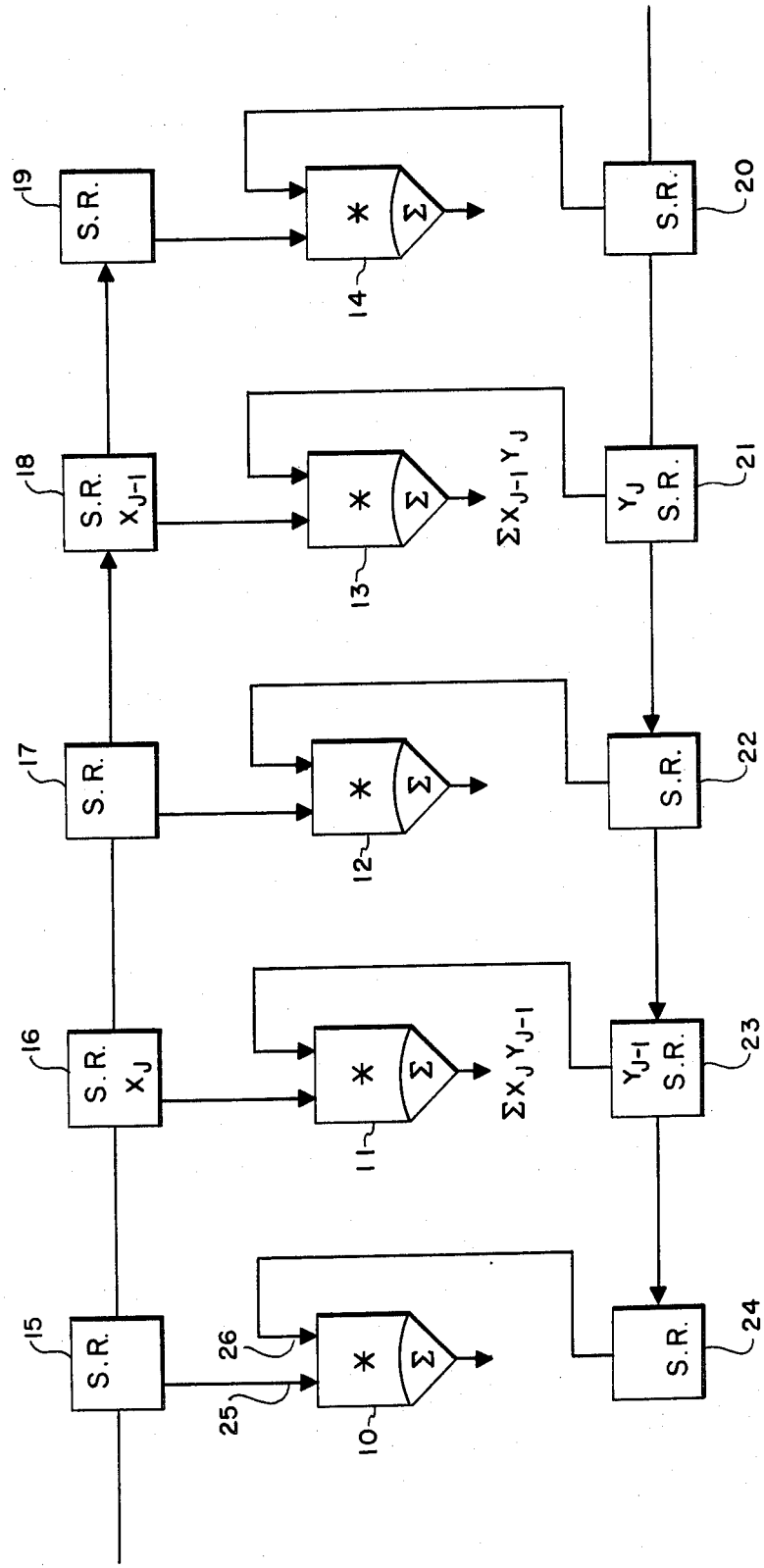
FIG. 2B is a block diagram of a prior art systolic array for the calculation of correlations showing its state during a second clock cycle.
Figure 3:
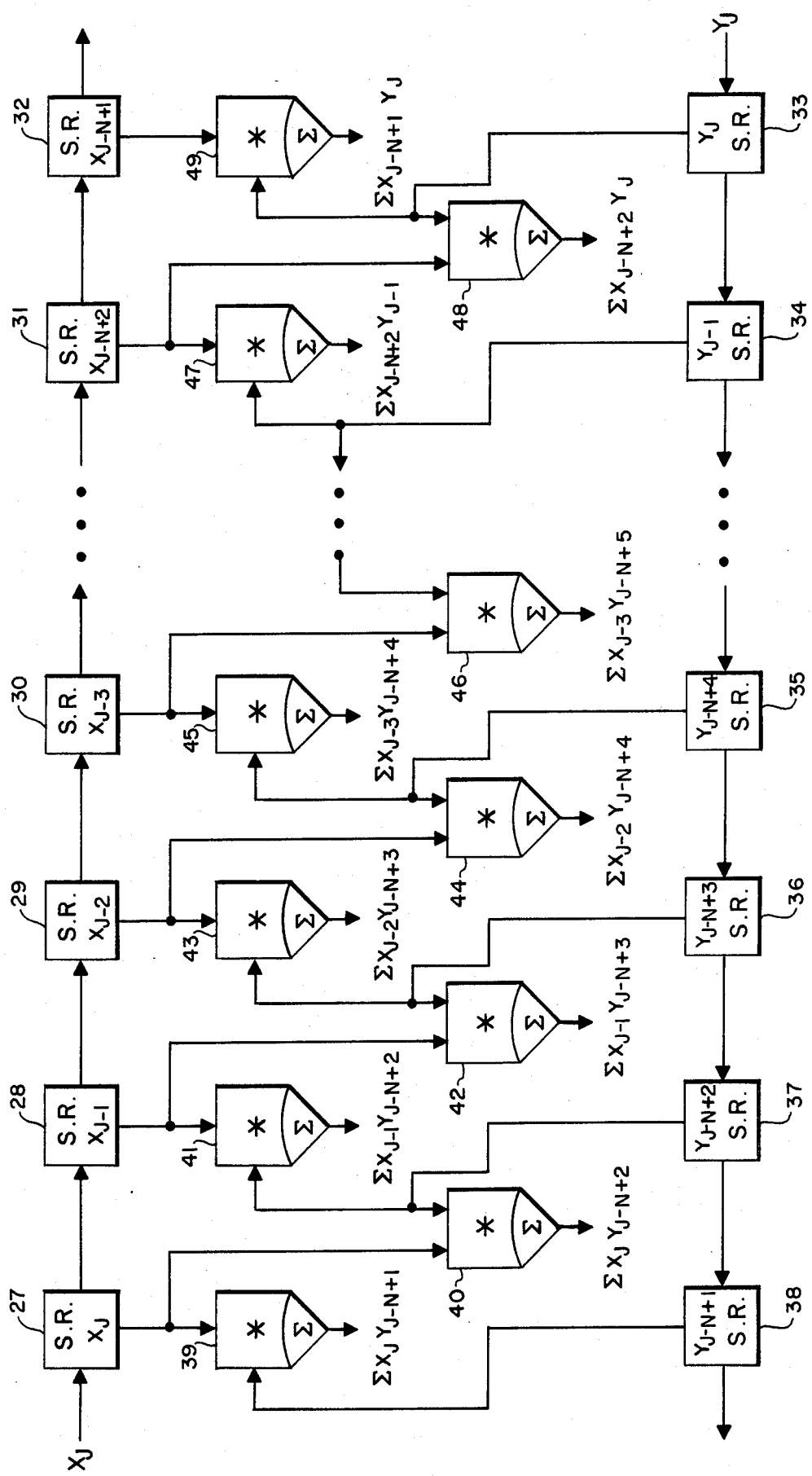
FIG. 3 is a block diagram of a preferred embodiment of the invention.

FIG. 3 illustrates a preferred embodiment of the present invention. As in the prior art two shift registers are used, but in the present invention each such shift register has N stages rather than 2N-1 as in the prior art. One shift register of the present invention includes stages 27, 28, 29, 30, 31, and 32, while the second shift register includes stages 33, 34, 35, 36, 37, and 38. Additionally this embodiment includes multiply-accumulate devices 39, 40, 41, 42, 43, 44, 45, 46, 47, 48, and 49. More shift register stages and multiply-accumulate devices may be used to increase the bandwidth of the system, but the relationship of two N stage shift registers and 2N-1 multiply-accumulate devices should be maintained.

The contents of shift register stage 27 are provided to multiply-accumulate devices 39 and 40. Likewise the contents of shift register stage 28 are provided to multiply-accumulate devices 41 and 42. Similarly the contents of each stage of the first shift register except stage 32 are provided to two different multiply-accumulate devices. The contents of shift register stage 32 are provided only to multiply-accumulate device 49.

The contents of the stages of the second shift register are distributed in a similar manner. The contents of shift register stage 33 are provided to multiply-accumulate devices 48 and 49. The contents of shift register stage 38 are provided only to multiply-accumulate device 39. Those skilled in the art will notice that the connections of the stages of the shift registers to the multiply-accumulate devices are staggered, so that, for example, the contents of shift register stage 29 are provided to multiply-accumulate devices 43 and 44 while the contents of shift register stage 36 are provided to multiply-accumulate devices 42 and 43. In this way all of the summations performed by the prior art systolic array may be performed by the invention, but in an expedited fashion requiring half as many shift operations, because, unlike with the prior art systems, data values may be loaded into consecutive shift register stages. Furthermore the multiply-accumulate devices are required to function for half as many time periods, because all of such devices function during each time period.

The embodiments of the invention in which an exclusive property or right is claimed are defined as follows:

1. A systolic computational array comprising:

a plurality of multiply-accumulate devices, each of said multiply-accumulate devices having a first input means adapted to accept members of a first series of numerical data and a second input means adapted to accept members of a second series of numerical data, each of said multiply-accumulate devices being adapted to accumulate a sum of products of members of said first series of numerical data and members of said second series of numerical data;

a first shift register having a plurality of stages, each of said stages being adapted to retain a value representative of a member of said first series of numerical data and to provide said value to said first input means of at least one of said multiply-accumulate devices, selected ones of said first shift register stages being adapted to provide said values to said first input means of at least two of said multiply-accumulate devices;

a second shift register having a plurality of stages, each of said stages being adapted to retain a value representative of a member of said second series of numerical data and to provide said value to said second input means of at least one of said multiply-accumulate devices and selected ones of said stages of said second shift register are adapted to provide said values to at least two of said second input means of said multiply-accumulate devices.

2. The systolic computational array of claim 1 wherein:

said first shift register includes N stages;

said second shift register includes N stages; and said plurality of multiply-accumulate devices includes 2N−1 multiply-accumulate devices, where N is a positive integer.

3. The systolic computational array of claim 2 wherein:

said first shift register includes a final stage, said first shift register final stage being adapted to provide a value contained therein to one of said first input means of said multiply-accumulate devices, the remaining of said first shift register stages being adapted to provide a value contained therein to two of said first input means of said multiply-accumulate devices; and said second shift register includes a final stage, said second shift register final stage being adapted to provide a value stored therein to said second input means of one of said multiply-accumulate devices and the remaining of said second shift register stages being adapted to provide a value contained therein to two of said second input means of said multiply-accumulate devices.

4. The systolic computational array of claim 3 wherein each of said first and second input means of said multiply-accumulate devices is adapted to receive signals from exactly one of said stages of said first and second shift registers.

* * * * *